(12) United States Patent
Wertz et al.

(10) Patent No.: US 11,537,110 B2
(45) Date of Patent: Dec. 27, 2022

(54) PROGRAMMABLE ELECTRONIC POWER REGULATOR

(71) Applicant: KEBA Industrial Automation Germany GmbH, Lahnau (DE)

(72) Inventors: Harald Wertz, Soest (DE); Patrick Tien, Unna (DE); Gerald Herrmann, Froendenberg (DE); Heiko Bach-Preckwinkel, Dortmund (DE)

(73) Assignee: KEBA INDUSTRIAL AUTOMATION GERMANY GMBH, Lahnau (DE)

( * ) Notice: Subject to any disclaimer, the term of this patent is extended or adjusted under 35 U.S.C. 154(b) by 0 days.

(21) Appl. No.: 17/763,257

(22) PCT Filed: Sep. 22, 2020

(86) PCT No.: PCT/EP2020/076412
§ 371 (c)(1),
(2) Date: Mar. 24, 2022

(87) PCT Pub. No.: WO2021/058471
PCT Pub. Date: Apr. 1, 2021

(65) Prior Publication Data
US 2022/0342396 A1    Oct. 27, 2022

(30) Foreign Application Priority Data
Sep. 25, 2019   (DE) .................... 10 2019 125 867.7

(51) Int. Cl.
*G05B 19/418*    (2006.01)
(52) U.S. Cl.
CPC ..... *G05B 19/4184* (2013.01); *G05B 19/4188* (2013.01)

(58) Field of Classification Search
CPC ................... G05B 19/4184; G05B 19/4188
See application file for complete search history.

(56) References Cited

U.S. PATENT DOCUMENTS

| | | |
|---|---|---|
| 10,017,188 B2 | 7/2018 | Freiwald et al. |
| 2013/0231767 A1 | 9/2013 | Sabapathy et al. |
| (Continued) | | |

FOREIGN PATENT DOCUMENTS

| | | |
|---|---|---|
| DE | 102005007477 A1 | 8/2006 |
| DE | 102012012521 A1 | 1/2014 |
| DE | 102015003194 A1 | 9/2016 |

*Primary Examiner* — Christopher E. Everett
(74) *Attorney, Agent, or Firm* — Leydig, Voit & Mayer, Ltd.

(57) ABSTRACT

A programmable electronic power regulator includes a power module for controlling an actuator, a control module for actuating the power module, and an internal monitoring module for transferring the control module to an emergency operation. The internal monitoring module is configured to monitor a system state, detect a critical operating state, and output an error signal. The control module comprises: a basic controller, which is configured to output a power module control signal, and in which functions for open- and closed-loop control of the actuator are implemented, which are required for an emergency operation in a critical operating state; an additional controller, in which functions that are not needed for emergency operation are implemented; and a controller disconnection point, which connects the basic controller with the additional controller via a control connection, and which is configured to at least partially disconnect the control connection upon receipt of the error signal.

16 Claims, 1 Drawing Sheet

(56) References Cited

U.S. PATENT DOCUMENTS

| | | |
|---|---|---|
| 2015/0338835 A1 | 11/2015 | Holler et al. |
| 2016/0264150 A1* | 9/2016 | Freiwald .................. G05B 9/03 |
| 2020/0073355 A1* | 3/2020 | Veryha ................... G06F 13/20 |
| 2020/0133243 A1* | 4/2020 | Scheible ............ G05B 19/4184 |
| 2021/0206505 A1* | 7/2021 | Maalioune ............. G05B 15/02 |

\* cited by examiner

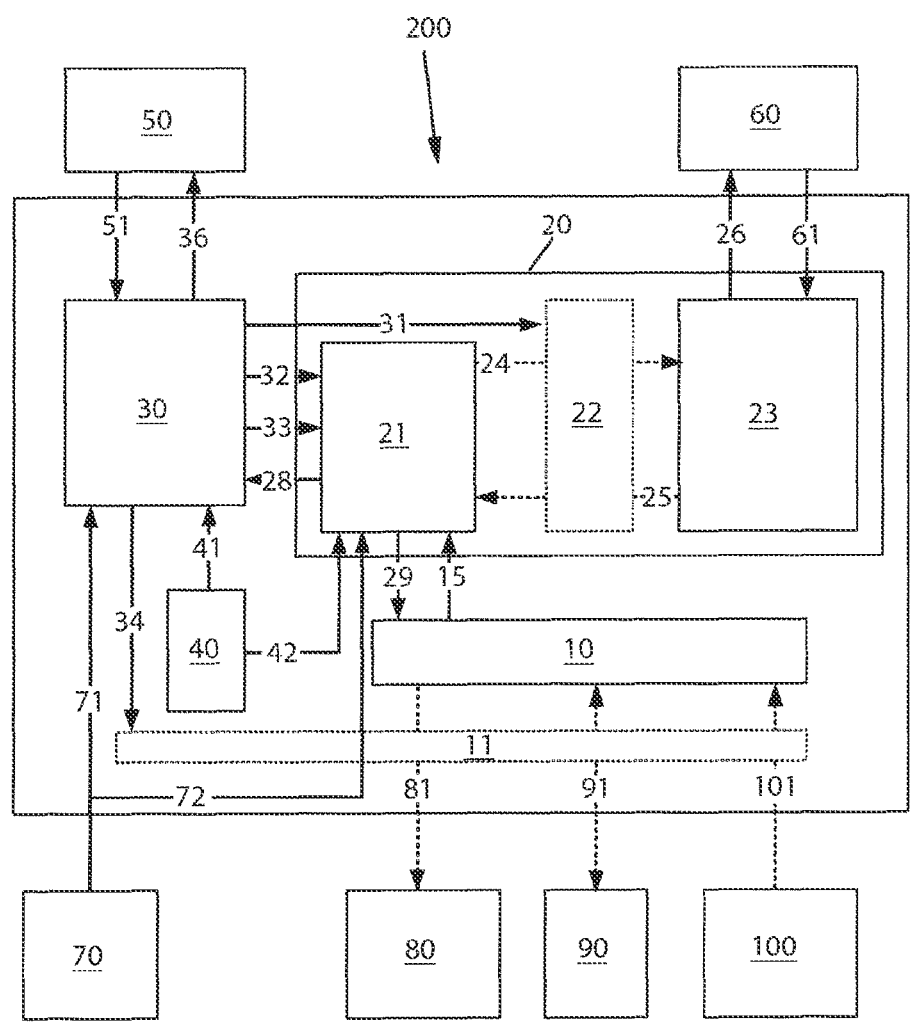

PROGRAMMABLE ELECTRONIC POWER REGULATOR

CROSS REFERENCE TO RELATED APPLICATIONS

This application is a U.S. National Phase application under 35 U.S.C. § 371 of International Application No. PCT/EP2020/076412, filed on Sep. 22, 2020, and claims benefit to German Patent Application No. DE 10 2019 125 867.7, filed on Sep. 25, 2019. The International Application was published in German on Apr. 1, 2021 as WO 2021/058471 A1 under PCT Article 21(2).

FIELD

The invention relates to a programmable electronic power regulator having a power module for controlling at least one, in particular electromechanical actuator which is or can be connected to the power module by means of an actuator control signal, for example in the form of an applied voltage or a suitably selected current. The voltage or the current may be provided by a suitable energy supply and adjusted correspondingly in the power module of the power regulator, for example by means of a thyristor power controller, a transformer, an inverter, a pulse width modulator or a similar electronic device, with which the output power or output current and/or the output voltage are variably adjustable.

The power regulator further has a control module for actuating or controlling the power modules by means of a power module control signal and an internal monitoring module for transferring the control module to emergency operation. In emergency operation, the control module is adapted to execute a predefined error response and is configured to place the actuator in a safe state, wherein the internal monitoring module is configured to monitor a system state, to detect a critical operating state, and if a critical operating state is detected to issue at least one error signal, which in particular places the control module or the power regulator into emergency operation, respectively.

BACKGROUND

Programmable power regulators of such a kind are often used in systems in which simply shutting down one or more electromechanical actuators in the event of a fault (i.e., a critical operating state) is or can be dangerous because there is at least one critical operating phase of the system in which simply switching the actuators off would violate one or more safety objectives for the system. A frequent application, preferred according to an embodiment of the invention, is a pitch system of a wind power plant, with which the rotational position of at least one rotor blade is set on the rotor hub. Other reasonable areas of application may be critical production processes or electrically powered vehicles. In such systems, error tolerance measures must be provided which, in the event of an error, enable at least an emergency operation of the system ("fail-operational system").

Programmable electronic power regulators are almost always used in regulated electromechanical actuators. Besides the actual basic functions for controlling the actuator, they contain numerous additional functions, such as for reading in from external sensors, generating kinematic motion profiles and real-time communication with other systems via complex communication interfaces. Other additional functions enable convenient diagnostics, parameterisation, user programming and commissioning of the programmable electronic power regulator, for example. The complexity of such programmable power controllers poses significant risks for undiscovered, systematic software errors.

Software errors in the complex additional functions can prevent the reliable transition of the power controller from normal operation to emergency operation, for example if the software freezes during processing or, for example, uses excessive processing power in an endless loop. If several complex power controllers of the same type are used in one system, there is a high risk of system-critical "common cause" errors. An adequate minimisation of the probability of occurrence of these common cause errors through error-avoidance measures during product development is typically not possible to a sufficient degree with complex systems—even if only for cost reasons.

The integration of functional safety in the control of electromechanical actuators, e.g., in electrical drive systems, has been known for several years and has been introduced in industrial practice. The safe state of the actuator is usually standstill with safe shutdown of torque or force generation and safe brake control. Even safety functions that can be requested while movement continues, such as safely limited torque, safely limited speed or safely limited position range, always include the shutdown and subsequent switch-off of the torque and force as a safe error response after a malfunction is detected.

A complex error response may in particular be reaching a safe position within a specified time. An example of this is, for example, a pitch drive for adjusting the rotor blade angle of a wind turbine. Depending on the application, further possible error responses may be to maintain a drive speed or to reduce/increase a drive speed to a given target value according to a defined acceleration or braking ramp.

The prerequisite for performing a complex error function is that, despite the critical operating state, this error response can still be controlled reliably by the control module of the power controller. However, this is not possible if the control module itself is no longer functioning properly, due to software errors in complex additional functions, for example, and for example the processor power is entirely occupied by running an additional function which has nothing to do with safety.

DE 10 2012 012 521 A1 describes a programmable controller for safety-critical applications in a machine environment. It is provided that the function of safety-critical program components is not affected by errors or processes from other program components. Various criteria can be used to control the flow of application programs; for example, flow control may be assured on the basis of a runtime system in conjunction with an operating system. A normal and a safe program run in parallel and independently on the basis of a runtime system structure, wherein it is suggested that all components that are important for control be integrated on a hardware component with a specific hardware architecture and that they be separated from each other by means of an at least dual runtime system structure for two runtime systems, to allow changes to be made to components which are not safety-critical. The separation may be enabled in particular by prioritising one of the runtime systems.

DE 10 2005 007 477 A1 discloses a programmable controller for machine and/or system automation with a standard controller with standard control functions and a safety controller with safety functions based on a PC. The safety controller consists of one or more safety modules connected to the PC bus, and safety-certified firmware is provided in the safety modules. The control thus offers a separation between the non-safety-related standard function and the safety function through modular division within the control unit. With this division, the standard function is not subject to any safety-related restrictions and can be implemented in a correspondingly complex manner.

SUMMARY

In an embodiment, the present invention provides a programmable electronic power regulator. The programmable electronic power regulator includes a power module configured to control, by an actuator control signal, at least one actuator that is connectable to the power module. A control module is configured to actuate, by a power module control signal, the power module. An internal monitoring module is configured to transfer the control module to an emergency operation, in which the control module is configured to execute a predefined error response and place the actuator in a safe state. The internal monitoring module is configured to monitor a system state, to detect a critical operating state, and to output at least one error signal. The control module comprises: a basic controller, which is configured to output the power module control signal, and in which functions for open- and closed-loop control of the at least one actuator are implemented, which are required for an emergency operation in a critical operating state; an additional controller, in which functions that are not needed for the emergency operation in the critical operating state are implemented; and a controller disconnection point, which connects the basic controller with the additional controller via a control connection, and which is configured to receive the at least one error signal from the internal monitoring module and to at least partially disconnect the control connection upon receipt of the at least one error signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

The single FIG. 1 shows a schematic diagram of the functional components of a programmable electronic power regulator.

DETAILED DESCRIPTION

In view of the situation as described, embodiments of the invention provide a programmable electronic power regulator with which complex error responses can still be reliably processed by the control module even in a critical operating state in order to bring the system to a safe standstill in a defined manner.

According to an embodiment of the invention, the reliable processing of the complex error responses by the control module even in a critical operating state in order to bring the system to a safe standstill in a defined manner is achieved with a programmable electronic power regulator of the type described in the introduction, in particular in that the control module of the programmable electronic power regulator has a basic controller, an additional controller and a controller disconnection. In particular, the control module may consist of these three components.

The basic controller is configured to output the power module control signals. Additionally, the or preferably all of the functions for autarchic open- and closed-loop control of the actuator that are necessary for emergency operation in a critical operating state are implemented in the basic controller. Accordingly, the basic controller is that part of the control module which controls the actuator (i.e., outputs the control signals to the power module). The power module then provides the power required for the actuator in the form of an actuator control signal. The actuator control signal may in particular be a current and/or voltage signal with which the actuator, for example a three-phase motor, is supplied.

The functions implemented for autarchic open- and closed-loop control of the actuator include, in particular, instructions for converting (logical) control commands from an open- and/or closed loop controller into (machine-oriented) power module control signals, as well as the open- and closed-loop control algorithms for the actuator and possibly a sensor system required therefor.

In the case of a pitch drive of a wind turbine for rotational adjustment of one of the rotor blades on a rotor hub, as a preferred application the electromechanical actuator may in particular be a three-phase drive (three-phase motor). In this case, the basic controller for autarchic open- and closed-loop control of the three-phase drive comprises in particular a measured value acquisition, a field model (which is used to describe the state of the actuator or of the system controlled by the actuator, mostly on the basis of the acquired measured values), a closed-loop current control, a modulation, a speed control.

Functions that are not required for emergency operation in a critical operating state are implemented in the additional controller. These may include functions such as evaluating external sensors, generating kinematic motion profiles or real-time communication with external systems via (in some cases complex) communication interfaces. Such functions are particularly useful and desirable for optimising the operation of the system controlled by the actuator, but are not safety-critical. Further additional functions enable, for example, convenient diagnostics, parameterisation, user programming and commissioning of the programmable electronic power regulator, and simplify maintenance and servicing.

As an optional element, therefore, according to an embodiment of the invention the electronic power regulator may thus be connected or connectable to an external control via an interface of the additional controller. According to an embodiment of the invention, the additional controller may be set up to send operating data from the additional controller to the external controller and/or to receive control data from the external controller.

The controller disconnection point provided according to an embodiment of the invention connects the basic controller with the additional controller via a control connection, which may include both a control connection from the basic controller to the additional controller and a control connection from the additional controller to the basic controller. In normal operation, the control connection allows the basic controller and the additional controller to be used jointly, and they can exchange data with one another. Thus, in normal operation it is possible to execute not only those functions which are (also) needed in emergency operation and are implemented in the basic controller, but also the functions that can only be executed in normal operation and are implemented in the additional controller.

In the event of an error, i.e., when a critical operating state is detected by the internal monitoring module, the controller disconnection point is configured to receive the error signal from the internal monitoring signal and, having received it, to at least partially disconnect the control connection, for example in a connection direction of the control connection from the basic controller to the controller or in a second connection direction of the control connection from the additional controller to the basic controller, but preferably completely in both connection directions. In other words, the monitoring module according to an embodiment of the invention is configured to perform a functional disconnection of the basic controller from the additional controller in emergency operation, so that any external influence on the basic controller by the additional controller can be prevented.

With the programmable electronic power regulator according to an embodiment of the invention, it is possible to implement a method, also according to an embodiment of the invention, with which a safe actuator control is implemented in the control module, in which after a malfunction is detected a switch is made to emergency operation with a reduced range of functions, in which the basic controller carries out a complex error response autarchically, without interference and/or access by an additional controller before the actuator is safely shut down in a manner that is usual in the prior art. According to an embodiment of the invention, in emergency operation in particular the execution of an error evaluation in the software can be dispensed with. Such an error evaluation is typically laborious and is used in particular to systematically detect and report malfunctions before a critical operating state is reached. The possibility thus exists to correcting systematic errors through software updates and/or to prevent the development of a critical operating state ahead of time. When the critical operating state is reached, resources are shifted to executing a complex error function. Therefore, according to an embodiment of the invention a (comprehensive) error evaluation may be implemented in the additional controller and consequently may not be available in emergency operation.

In the context of embodiments of the invention, it was recognised that the problems in emergency operation occur particularly when the software components for basic functions and additional functions are executed on the same microcontroller and share resources (CPU, peripherals, memory). To avoid this problem, the various parts of the control were divided into a—self-sufficient—basic controller and an additional controller, reliable controller disconnection point being provided to reliably separate the two sub-controllers from one another, especially in the event of a critical error. The solution according to embodiments of invention initiates emergency operation with a reduced range of functions, that is to say by separating the complex control hardware and software into a basic controller and an additional controller through an independent monitoring module. The basic controller only contains the hardware and software components required for the reduced functional scope of emergency operation, which overall entail significantly less complexity than the additional controller. An advantage of this is that the safety-related evaluation of the software of the actuator control (i.e., the control module) can be limited to the software of the basic controller and is therefore substantially simpler than the evaluation of the complete control software.

In a simple embodiment the separation of basic controller and additional controller may be achieved by inserting a preferably bidirectional interface between the two controllers, thereby enabling a control connection (in the sense of a communication connection) between the two controllers so that data can be exchanged between the two controllers. In such a case, it is possible to separate the basic controller from the additional controller by interrupting the communication interface.

In a further embodiment, which may be implemented alternatively or additionally, the controller disconnection point may be implemented in the form of a memory protection device which is configured to protect specified memory areas of the basic controller from influence by the additional controller. For this purpose, for example, an access restriction (a write restriction, for example, possibly even in conjunction with a read restriction) regarding access to memory areas of the basic controller may be implemented. This also prevents a technical software problem in the additional controller from affecting the basic controller. This is also characterized as disconnection of the control connection between the basic controller and the additional controller.

In a further embodiment, which may be realised alternatively or additionally, the controller disconnection point may be configured to place the additional controller in a reset state upon receipt of the error signal from the internal monitoring module, and to keep it in this state until emergency operation is ended. In the reset state, the additional controller has no effect on the power regulator, so the basic controller cannot be affected by the additional controller. This too separates the control connection between basic controller and additional controller.

According to a preferred embodiment of the power regulator according to the invention, the control module may include a plurality of processors, the basic controller and the additional controller each being implemented on different processors. Thus at least one dedicated processor is provided for both the basic controller and the additional controller. In this way, the separation of basic controller and additional controller may also be implemented in the hardware. If necessary, in emergency mode the processor may be shut down or deactivated together with the additional controller in order to avoid any influence by the additional controller on the execution of the complex error responses, and in this way to separate the control connection between the basic controller and the additional controller.

In a similar embodiment of the invention, the control module may have a multi-core processor, the basic controller and the additional controller each being implemented on at least one different core of the multi-core processor. In this way, too, a separation of the control connection between the basic controller and the additional controller is achieved at the hardware level.

As a further safety feature, the power module according to an embodiment of the invention may have a power module disconnection point which is arranged between the power module and a connection to the actuator and is configured to receive the error signal from the internal monitoring module and, after receiving said signal, not to forward the actuator control signal to the actuator connection (effectively: not to one or more actuators). This is approximately equivalent to an emergency stop function, which completely de-energises the connection to the actuator, i.e., causes the actuator to stop immediately. In this case, the complex error response according to an embodiment of the invention can no longer be carried out. Such a case may occur after the failure of critical hardware components that no longer allow emergency operation of the power regulator. In this case, it may be advisable to shut down electromechanical actuators immediately.

In this case, (effectively as a second fallback level for error handling) the internal monitoring module may thus disconnect one or possibly more externally connected components from the power regulator by activating the power module disconnection point by means of an error signal to the power module disconnection point. In this way, a power flow between externally connected components and the power regulator can be prevented. The multiple components may possibly be various actuators that perform different adjustment processes and can be addressed separately or together by the power regulator. Possible actuators may be motors, a service holding brake or other electrically operated devices. A service holding brake, for example, may be realised in such a form an energy supply is needed to release the brake, and the brake engages when the energy supply is removed.

Other components connected to the power module may be an energy supply, for example a mains supply or energy storage system. Activation of the power module disconnection point may preferably also disconnect the energy supply from the power module of the power regulator and thus shut down all connected actuators.

The individual components can be separated selectively, in groups or together.

In a particularly preferred embodiment of the invention, an internal sensor, an external sensor and/or an external monitoring module may be connected to the internal monitoring module, the internal sensor, the external sensor and/or the external monitoring module being configured to transmit data signals to the internal monitoring module. The internal and external sensors may be for example measured value transmitters with sensors which transmit the sensor signals and/or sensor values derived from the sensor signals as a data signal. The external monitoring module may be an independent safety module for detecting error or danger situations, which collects and evaluates autarchically collected information (measured values, state values or other data). An error signal may then be sent to the internal monitoring module as a data signal, for example. This error signal may be considered to be a signal to the internal monitoring module requiring the programmable electronic regulator to be placed in emergency operation, in which, according to an embodiment of the invention, the basic controller is separated from the additional controller (execution of a complex error response) and/or to disconnect the power module from connected actuators, from the power supply and/or other connected power components (shutdown of the component, particularly in the sense of an emergency stop).

The basic controller may also be connected directly to the internal monitoring module and send data signals to the internal monitoring module. One possibility for such a data signal is an error signal. This error signal may also be understood as a signal to the internal monitoring module requesting that the programmable electronic power regulator be switched to emergency operation, for example if a state of the basic controller and/or (in normal operation as well) the additional controller is recognized in the basic controller as critical which might possibly lead to a failure of the basic and/or additional controllers.

In response to the evaluation, if the internal monitoring module detects a critical operating situation the internal monitoring module may transmit one or more error signals.

A critical operating situation may be identified, for example, by comparing the received data signals with permissible ranges. A combination of multiple data values is also possible, if necessary using algebraic rules, fuzzy logic methods or using artificial intelligence (AI).

The internal monitoring module may also recognize different levels of critical operating states and send out different error signals depending on the level detected. Various possibilities for error signals are explained below. All of these error signals may be transmitted individually or in any combination, possibly in addition to the error signal to the controller disconnection point described earlier.

In an advantageous embodiment according to the invention, the internal monitoring module may be configured to send an error signal (restart error signal) to the basic controller, wherein the basic controller is set up to trigger a restart of the basic controller when said error signal is received. If the complex, programmable electrical power regulator fails during a critical system state, emergency operation may thus be activated by restarting the software of the actuator controller.

According to a preferred embodiment, the restart takes place in such a way that the control module automatically works in an emergency mode after the restart triggered by the restart error signal, i.e., the basic controller is disconnected from the additional controller. During the restart, the entire controller may preferably be shut down and only the basic controller started. In this way, the restart can be performed as quickly as required by the system safety response time. After the restart, the software automatically works in emergency mode, in which the complex additional functions of the programmable electrical power regulator that are not required are reliably deactivated. Consequently, the potentially dangerous effect of systematic software errors in the complex additional functions on the availability of the basic functions required for emergency operation is eliminated. The additional controller may for example be kept in the reset state described earlier until the critical operating situation no longer exists.

A particular advantage of this embodiment of the invention consists in that the basic controller works in a defined operating state after the quick restart, and pending complex error responses can be executed reliably.

According to a further embodiment, the internal monitoring module may be configured to send an error signal to the basic controller, wherein the basic controller is configured to prepare for emergency operation when this error signal (early warning error signal) is received. This early warning error signal may be sent very early by the internal monitoring module, for example if there is an indication of a possible critical operating state in the internal monitoring module, for example without having been fully confirmed in the internal monitoring module. Such an early warning error signal may be used for example in the basic controller to check the operating state of the basic controller, to cancel functions carried out at the request of the additional controller and/or to send a data signal to the internal monitoring module that a restart of the basic control is advisable or necessary. Such an early warning error signal can initiate an orderly transition to emergency operation.

According to an embodiment of the invention, a further error signal may be sent to the external monitoring module in order to forward the occurrence of a critical operating state to an alarm control centre for reporting an alarm, for example. The external monitoring module may also be the internal monitoring module or modules of one or more further programmable electrical power regulators installed in the same system. This enables various power regulators to be networked in the same system. This is advantageous because critical operating situations detected for one power regulator, in particular originating from environmental influences, often apply to the other power regulators of the same system as well. This can be detected rapidly across the entire system on the basis of such a network.

Besides the error signal after the occurrence of the critical operating state or the initiation of emergency operation, a previously described early warning error signal may also be sent to the external monitoring module.

In a particularly preferred embodiment, only the basic controller may be configured to send power module control signals to the power module and/or execute other (essential) functions of the control module. In this way, essential functions of the basic controller, in particular the functions associated with the direct control of the actuator, can be controlled solely by the basic controller both in normal operation (i.e., with basic controller and additional controller active) and in emergency mode (i.e., with basic controller active and additional controller disabled/deactivated). It may therefore be assumed that these functions will then be executed without errors in emergency operation as well. In other words, at least a large part of the functions required in emergency operation are also constantly in operation or in use during normal operation. These functions may therefore be regarded as operationally proven.

In order to also cancel an emergency operation again, for example when a critical operating state no longer exists, in accordance with an embodiment of the invention the internal monitoring device may be configured to detect the end of an emergency operation and to remove the programmable electronic power controller from emergency operation to switch the programmable electronic power regulator out of emergency operation to normal operation, in particular by deactivating the control disconnection point and/or the power module disconnection point.

The internal monitoring device may advantageously be an autarchic functional unit of the programmable electronic power regulator, which can be operated independently of the control module. In other words, this means that in this embodiment the internal monitoring unit of the power regulator is functional even when neither the control module nor the power module are activated. This independence from the other functional units of the power regulator results in a reliable safety function. In this way, the internal monitoring module can also take on a watchdog function and in particular check the functioning of the basic controller, for example, by querying certain state data on a quasi-continuous basis. If the state data is not received, the internal monitoring module can initiate a restart of the entire control module in normal operation or a restart of only the basic controller in emergency operation.

A further embodiment of the invention provides a particularly advantageous use of the programmable electronic power regulator according to any embodiment thereof for controlling a pitch system of a wind turbine with which the rotational position of a rotor blade or multiple rotor blades is set in the rotor hub. This constitutes a particularly safety-critical application because, for example, in the event of a storm or strong gusts of wind the rotor blades of the wind turbine must be moved into a vane position in which the wind blowing onto the rotor blades only transfers a small amount of force to the rotor blades, so that the worst case of rotor blades becoming detached from the rotor hub of the wind turbine is avoided.

An advantageous use is also practical in other applications, for example to ensure uninterrupted operation of actuators in critical, e.g. chemical production processes, in electric drive units or other applications in which simply switching off actuators (emergency stop) can lead to particularly dangerous situations.

Further advantages, features and application capabilities of embodiments of the invention are also identified in the following description of exemplary embodiments and the drawing. All of the features described in the text and/or illustrated in the drawing constitute the subject matter of the invention, either together or in any technically meaningful combination, regardless of how they are described in the described or illustrated exemplary embodiments.

The programmable electronic power regulator 200 comprises a power module 10, which is connected to a power supply 100 via a power connection 101 and/or an energy storage system 90 via a power connection 91—in case of a power failure, for example—for the purpose of supplying energy. The power module 10 controls an actuator 80 connected to the power regulator 200 via an actuator control signal 81.

The power module 10 is controlled by a control module 20 via a power module control signal 29. State data regarding the power module 10 is reported back to the control module 20 via a feedback signal 15.

In order to enable the control module 20 to continue processing complex error responses reliably even in critical operating situations and to be able to bring the system to a defined standstill in a safe manner, the programmable electronic power regulator 200 has an autarchically functioning internal monitoring module 30 which is configured to detect and evaluate a critical operating state.

The internal monitoring module 30 receives data signals 41 from an internal signal generator 40 for the evaluation. The internal signal generator 40 may in particular contain sensors that detect state values such as a temperature in the power controller 200, for example, and send them to the internal monitoring module 30 as data signals 41.

Similarly, external sensors of an external signal generator 70, i.e., connected outside the power regulator 200, are connected to the internal monitoring module 30 and send detected state values to the internal monitoring module 30 via a data signal 71.

The internal monitoring module 30 receives a further data signal 51 from an external monitoring module 50 which, for example, can detect and evaluate external environmental influences on the system influenced by the actuator. If these external environmental influences indicate a state that is dangerous for the system influenced by the actuator 80, the external monitoring module 50 sends a data signal 51, which is to be understood as a signal requesting that the internal monitoring module 30 recognise a dangerous operating state.

The data signals 41, 71, 51 arriving in the internal monitoring module 30 are recorded and evaluated by software. If the internal monitoring module 30 detects a critical operating state, it places the control module 20 in emergency mode by sending an error signal 31.

Unlike a mere emergency stop function, the emergency operation of control module 20 must still execute a complex error response and act appropriately on the actuator 80 via the power module control signal 29 to bring the system to a safe standstill in a defined manner. Rules as to how this complex error response should look in practical terms can be input to the control module 20, for example by means of suitable programming of certain process sequences.

Since complex controllers with wide-ranging functions and particularly programmable controllers are prone to software errors or malfunctions, while the other hand safety-critical functions must still be performed reliably, an embodiment of the invention proposes a division of control in the control module 20 into a basic controller 21 and an additional controller 23.

The basic controller 21 contains the hardware and software components required for the reduced functionality of emergency operation. These include in particular the connection for outputting the power module control signal 29 and connections for data signals 42, 72 from the internal signal generator 40 and the external signal generator 70. The sensor values captured by these signal generators 40, 70 are typically also needed for processing of the complex error response.

The additional controller 23 contains additional functions which are not required for emergency operation, such as for evaluating external sensors in an external controller 60, for generating kinematic motion profiles and for real-time communication with external systems (e.g. external controller 60) via (complex) communication interfaces. The external controller 60 receives a data signal 26 with operating data from the controller (receiving operating data sent by the additional controller 23) and sends a data signal 61 with external control data (transmission of data by the external controller 60, which is received by the additional controller 23).

Further additional functions of the additional controller 23 enable convenient diagnosis, parameterisation, user programming and commissioning of the programmable electronic power regulator 200, for example.

In order to avoid errors during the execution of functions of the basic controller 21 by the additional controller 23, for example due to software errors, without having to subject the entire software of the additional controller to a complex safety check, the control module 200 is equipped with a controller disconnection point 22, which is arranged in a control connection 24 from the basic controller 21 to the additional controller 23 and in the control connection 25 from the additional controller 23 to the basic controller 21, and can be activated to set up emergency operation by an error signal 31 from the internal monitoring module 30. Activation of the controller disconnection point 22 prevents the additional controller 23 from accessing the basic controller 21. This can be implemented technically in a variety of ways, for example by preventing the additional controller 23 from accessing the basic controller 21 memory, by placing the additional controller 23 in a deactivated or reset state (i.e., effectively powering the additional controller 23 down), by disconnecting a communication link between the basic controller 21 and the additional controller 23, which are implemented for example on separate processors and connected to one another via a communication link, or similar technically suitable measures.

This is a very effective way of restricting the functions of the control module 20 to those functions that are essential in emergency operation and of avoiding errors in emergency operation due to complex functions of the additional controller 23.

The internal monitoring module 30 can also send an error signal 32 to the basic controller 21, which in the basic controller 21 triggers a restart of the basic controller 21 in emergency operation and preferably simultaneous deactivation of the additional controller (restart error signal). In technical terms, this can be implemented for example by a quick shutdown of the entire control module 20 including basic controller 21 and additional controller 23, and a selective restart of the basic controller 21. Additionally, the internal monitoring module 30 can also issue an error signal 33 in advance if necessary, providing advance notice of an emergency operation (early warning error signal). This enables the basic controller 21 to prepare for emergency operation.

It may also be provided that if, for example, the basic controller 21 detects an unstable state of the additional controller 23 and/or the basic controller 21, it sends a data signal 28 with this information to the internal monitoring module 30 for evaluation, and this module evaluates this information and then if necessary, initiates emergency operation in the manner described.

Depending on the kind of the operating state ascertained by the internal monitoring module 30, an immediate emergency shutdown of the actuator 80 or the entire system may also be required instead of a complex error response for the controlled shutdown of actuator 80. In a preferred embodiment, the internal monitoring module 30 can achieve this without involving the basic controller 21 by means of an error signal 34 to a power module disconnection point 11, which is configured to selectively disconnect certain or all power inputs from an energy supply if activated by the error signal 34 (power supply 100, energy storage system 90) and selectively disconnect certain or all power outputs to one or more actuators 80 (in the figure, only one actuator is shown for the sake of simplicity). This replicates a classic emergency stop function.

In the event that emergency operation is initiated and/or for advance warning, the internal monitoring module 30 may also send an error signal 36 to the external monitoring module 50, which may be connected to a control room or a control centre, for example.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Power module
11 Power module disconnection point

15 Feedback signal
20 Control module
21 Basic controller
22 Controller disconnection point
23 Additional controller
24 Control connection from the basic controller to the additional controller
25 Control connection from the additional controller to the basic controller
26 Data signal with operating data
28 Data signal with operating data
29 Power module control signal
30 Internal monitoring module
31 Error signal to the controller disconnection point
32 Error signal to the basic controller for restart (restart error signal)
33 Error signal to the basic controller for prior notice (early warning error signal)
34 Error signal to the power module disconnection point
36 Error signal to the external monitoring module
40 Internal signal generator
41 Data signal
42 Data signal
50 External monitoring module
51 Data signal
60 External control unit
61 Data signal with external control data
70 External signal generator
71 Data signal
72 Data signal
80 Electromechanical actuator
81 Actuator control signal
90 Energy storage system
91 Power connection
100 Power supply
101 Power connection
200 Programmable electronic power regulator

The invention claimed is:

1. A programmable electronic power regulator comprising:
a power module configured to control, by an actuator control signal, at least one actuator that is connectable to the power module;
a control module configured to actuate, by a power module control signal, the power module; and
an internal monitoring module configured to transfer the control module to an emergency operation, in which the control module is configured to execute a predefined error response and place the actuator in a safe state, wherein the internal monitoring module is configured to monitor a system state, to detect a critical operating state, and to output at least one error signal,
wherein the control module comprises:
a basic controller, which is configured to output the power module control
signal, and in which functions for open- and closed-loop control of the at least one actuator are implemented, which are required for an emergency operation in a critical operating state,
an additional controller, in which functions that are not needed for the emergency operation in the critical operating state are implemented, and
a controller disconnection point, which connects the basic controller with the additional controller via a control connection, and which is configured to receive the at least one error signal from the internal monitoring module and to at least partially disconnect the control connection upon receipt of the at least one error signal.

2. The programmable electronic power regulator according to claim 1, wherein the controller disconnection point is a memory protection device, which is configured to protect defined memory areas of the basic controller from influence by the additional controller.

3. The programmable electronic power regulator according to claim 1, wherein the controller disconnection point is configured to place the additional controller in a reset state upon receipt of the at least one error signal from the internal monitoring module and to maintain the reset state until the emergency operation is terminated.

4. The programmable electronic power regulator according to claim 1, wherein the control module includes a plurality of processors, wherein the basic controller and the additional controller are each implemented on at least one different one of the processors.

5. The programmable electronic power regulator according to claim 1, wherein the control module includes a multi-core processor, wherein the basic controller and the additional controller are each implemented on at least one different core of the multi-core processor.

6. The programmable electronic power regulator according to claim 1, wherein the power module includes a power module disconnection point, which is arranged between the power module and a connection to the at least one actuator, and is configured to receive the at least one error signal from the internal monitoring module, and, upon receipt of the at least one error signal, to not forward the actuator control signal to the connection to the at least one actuator.

7. The programmable electronic power regulator according to claim 1, wherein an internal signal generator, an external signal generator and/or an external monitoring module is/are connected to the internal monitoring module and is/are configured to send data signals to the internal monitoring module.

8. The programmable electronic power regulator according to claim 7, wherein the external monitoring module is an internal monitoring module of another programmable electronic power regulator.

9. The programmable electronic power regulator according to claim 8, wherein the internal monitoring module is configured to transmit the at least one error signal to the basic controller, and wherein the basic controller is configured to trigger a restart of the basic controller upon receipt of said the at least one error signal.

10. The programmable electronic power regulator according to claim 7, wherein the internal monitoring module is configured to evaluate the received data signals, and, upon detection of the critical operating situation, to transmit the at least one error signal.

11. The programmable electronic power regulator according to claim 1, wherein the basic controller is connected to the internal monitoring module and is configured to send data signals to the internal monitoring module.

12. The programmable electronic power regulator according to claim 11 wherein the internal monitoring module is configured to transmit the at least one error signal to the basic controller, and wherein the basic controller is configured to prepare an emergency operation upon receipt of the at least one error signal.

13. The programmable electronic power regulator according to claim 1, wherein only the basic controller is configured to send the power module control signal to the power module.

14. The programmable electronic power regulator according to claim 1, wherein the internal monitoring device is configured to detect the end of the emergency operation and to switch the programmable electronic power regulator out of emergency operation and into normal operation.

15. The programmable electronic power regulator according to claim 1, wherein the internal monitoring device is an autarchic functional unit of the programmable electronic power regulator, which is operable independently of the control module.

16. Use of the programmable electronic power regulator according to claim 1, with which a rotational position of at least one rotor blade is adjusted on a rotor hub.

\* \* \* \* \*